United States Patent Office.

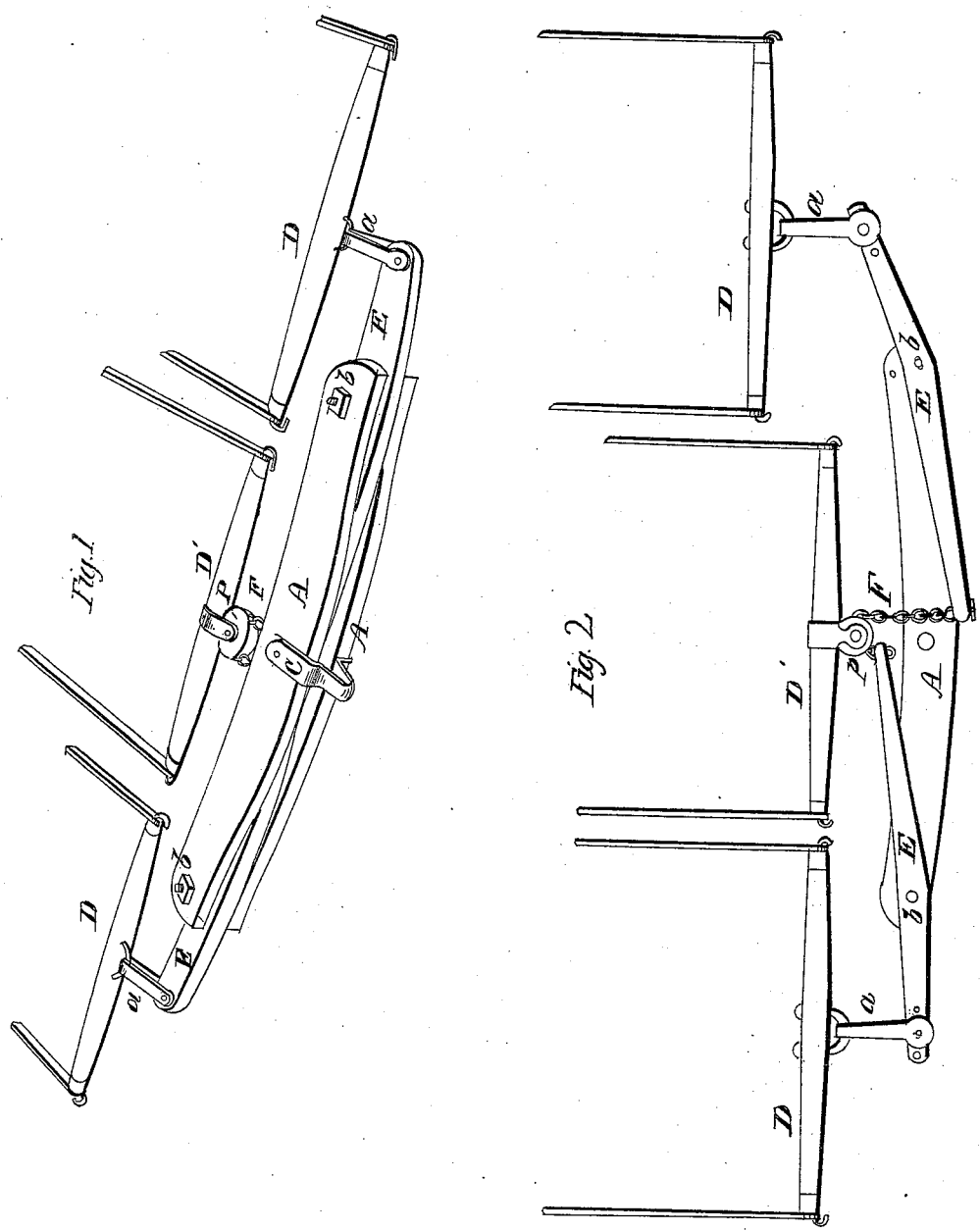

HARISON W. AUSTIN, OF PORTAGE, MICHIGAN.

Letters Patent No. 82,785, dated October 6, 1868.

IMPROVEMENT IN EQUALIZING WHIFFLE-TREE.

*The Schedule referred to in these Letters Patent and making part of the same.*

TO ALL WHOM IT MAY CONCERN:

Be it known that I, HARISON W. AUSTIN, of Portage, in the county of Kalamazoo, in the State of Michigan, have invented a new and useful Improvement in Equalizing-Attachments to the Eveners and Whiffle-Trees of three horses travelling abreast; and I do hereby declare the following to be a full, clear, and exact description of the same, reference being had to the annexed drawings, making a part of this specification, in which—

Figure 1 is a perspective view.

Figure 2 is a plan view, with upper double-tree strip removed.

Similar letters of reference indicate like parts in the several figures.

My invention relates to a new and useful mode of connecting the long arms of the equalizing-eveners with the whiffle-tree of the middle horse, and to an improved mode of constructing the double-tree and arranging it in relation with said eveners, whereby important advantages are obtained, as will hereinafter more fully appear; and the better to enable others skilled in this mechanical art to construct my invention, I will proceed to describe the same.

I construct my double-tree of two separate pieces or strips of wooden plank, of suitable size, as indicated at A.

The two equalizing eveners E are placed between the two double-tree strips, and vibrate between them on the pivot-bolts $b$, which pass entirely through and are secured in place by nuts or otherwise.

The eveners are of course pivoted at points two-thirds of their length distant from their inner ends, as in other arrangements, for the purpose of equalizing the draught-power of the middle horse of the team with that of the two outside horses; but the eveners should be so hung, in reference to the double-tree, that the inner ends of their long arms should come together as close as practicable, without rubbing against the bolt of the clevis C, connecting with the plow.

The double-tree and eveners may be made straight, instead of being curved in the manner shown, without material detriment, but I usually prefer to curve them, in order to give more play to the central pulley-chain, to be hereinafter described, and at the same time shorten up the outside connections.

I connect the whiffle-trees D of the outer horses to the short arms of the eveners E, by a staple or ring and clevis, as at $a$, or by any other well-known and suitable way; but I provide the whiffle-tree D' of the middle horse with a suitable horizontal-grooved pulley, $p$, which pulley may be either connected to it as seen, or hung within a clevis-iron linked to it.

A chain, F, or other equivalent tug of proper length, passes half around the grooved pulley $p$, and is connected to the ends of the long evener-arms either by hitching, (whiffle-tree fashion,) or otherwise, as may be deemed most convenient.

My purpose in connecting the eveners with the middle whiffle-tree by a chain and pulley, instead of by links, as in the arrangement patented by A. M. Beebe, October 14, 1862, is to protect the middle horse, usually the best of the team, against the results of any irregular and sudden spasmodic pulls of either or both of the outer horses, which tend so much to disturb the steadiness of said middle horse, and consequently the line of motion of the plow.

If the eveners are linked to the middle horse's whiffle-tree, it is evident that a sudden starting up of either one of the outside horses will react solely upon the middle horse; but by the arrangement of my chain and pulley, it will be as readily seen, by referring to the relative position of parts, as shown in fig. 2, that should one of the outer horses, by a sudden effort, start ahead, the reactionary check would not be operative solely against the middle horse, but would be divided between the other two, to the manifest advantage of the middle horse.

The free vibration of the eveners back and forth, when thus connected by chain and pulley, permits much greater freedom of action to the team, with less adverse effect upon the plow's line of motion.

I do not claim arranging the equalizing-eveners in line parallel with the whiffle-trees and double-tree; but having described my invention,

What I claim, and desire to secure by Letters Patent, is the following:

1. The arrangement of the equalizing-eveners E with both of the double-tree strips A, grooved pulley $p$, chain F, and whiffle-trees D and D', all constructed and operating substantially as and for the purpose herein set forth.

2. The arrangement of the eveners E E in such relation to the whiffle-tree D', by means of the pulley P and chain F, that when an outside horse starts, the reaction will be divided between the other horses, in the manner substantially as described.

HARISON W. AUSTIN.

Witnesses:
 HENRY L. WILBUR,
 CHARLES M. PHELPS.